(12) United States Patent
Schroderus et al.

(10) Patent No.: US 6,477,384 B2
(45) Date of Patent: Nov. 5, 2002

(54) CHECKING THE PRESENCE OF MOBILE STATIONS COMMUNICATING ON A DIRECT MODE CHANNEL

(75) Inventors: Osmo Schroderus, Sumiainen; Kimmo Kinnunen, Äänekoski, both of (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/125,101

(22) PCT Filed: Feb. 7, 1997

(86) PCT No.: PCT/FI97/00079
§ 371 (c)(1),
(2), (4) Date: Oct. 6, 1998

(87) PCT Pub. No.: WO97/29597
PCT Pub. Date: Aug. 14, 1997

(65) Prior Publication Data
US 2002/0068548 A1 Jun. 6, 2002

(30) Foreign Application Priority Data
Feb. 9, 1996 (FI) .................................................. 960612

(51) Int. Cl.⁷ .............................. H04B 7/00; H04Q 7/00
(52) U.S. Cl. ....................... 455/500; 455/410; 455/411; 455/518; 455/519
(58) Field of Search .................................. 455/403, 416, 455/445, 457, 456, 26.1, 410, 411, 518, 519, 500

(56) References Cited

U.S. PATENT DOCUMENTS

| | | | |
|---|---|---|---|
| 4,750,176 A | 6/1988 | Van Veldhuizen | |
| 5,216,675 A | 6/1993 | Melliar-Smith et al. | |
| 5,721,779 A | * 2/1998 | Funk .......................... | 380/23 |
| 5,771,463 A | * 6/1998 | Lehmutso et al. .......... | 455/509 |
| 5,907,794 A | * 5/1999 | Lehmutso et al. .......... | 455/509 |

FOREIGN PATENT DOCUMENTS

| | | | |
|---|---|---|---|
| EP | 0 663 737 | | 7/1995 |
| EP | 0 667 725 | | 8/1995 |
| EP | 0 689 303 | | 12/1995 |
| FI | WO 95/06395 | * | 8/1993 |
| FI | 94993 | | 5/1995 |
| FI | WO 95/15623 | * | 6/1995 |
| GB | 0 663 737 A2 | * | 12/1994 |
| GB | 2 280 085 | | 1/1995 |
| WO | WO 95/06395 | | 3/1995 |
| WO | WO 95/15623 | | 6/1995 |
| WO | WO 95/15666 | | 6/1995 |
| WO | WO 95/26614 | | 10/1995 |

OTHER PUBLICATIONS

Copy of the International Search Report for PCT/FI97/00079.

* cited by examiner

Primary Examiner—Dwayne Bost
Assistant Examiner—Lewis G. West
(74) Attorney, Agent, or Firm—Altera Law Group, LLC

(57) ABSTRACT

A method of checking the presence of mobile stations (DMRU:2, 500) communicating on a direct mode channel. The method comprises the steps of: a) sending (302) a presence inquiry message (106) provided with an identity from a first mobile station to a second mobile station (DMRU:2) on the direct mode channel, b) receiving said presence inquiry message at the second mobile station (DMRU:2), c) comparing the identity contained in said presence inquiry message (106) with the identity of the second mobile station, d) if the comparison shows that the identities are identical, sending an acknowledgment (107) containing the identity of the second mobile station from the second mobile station to the first mobile station on the direct mode channel, and e) indicating the result of the presence inquiry to the user (101) of the first mobile station.

2 Claims, 4 Drawing Sheets

CHECKING THE PRESENCE OF MOBILE STATIONS COMMUNICATING ON A DIRECT MODE CHANNEL

FIELD OF THE INVENTION

The invention relates to a method of checking the presence of mobile stations communicating on a direct mode channel.

The invention is intended to be used in communication between radio equipments, such as mobile stations or radio phones.

BACKGROUND OF THE INVENTION

Apart from system channels of radio telecommunications systems, direct mode channels can also be used, i.e. direct mode operation can be applied. Subscriber stations using direct mode operation do not communicate directly with a radio network or its base stations. Direct mode channels are frequencies at which the radio phones or other means of communication are able to communicate without the system directly with one another or—through repeater stations—with the base stations of the system or with other mobile stations.

Direct mode channels are typically used in situations where e.g. a group of hand-held mobile phones communicate with one another at such a long distance from a base station that system channels cannot be used.

Another important use of direct mode channels is in the addition of capacity when traffic increases rapidly (incident) in one part of the service area of the system, e.g. at one point of the radio network.

A direct mode channel is also called a direct or simplex channel, or a simplex connection. A direct mode channel is a channel that is typically not used by the system at all. It may be, for example, a channel with the same channel spacing as the channels of the mobile system, e.g. 12.5 kHz or 25 kHz. Of the radio phones operating on a direct mode channel, a transmitting station has tuned its transmitter to the channel and transmits speech or data information. The other radio phones set to direct mode operation have tuned their receivers to the same channel, whereby they immediately hear the transmission.

On a direct mode channel, both analogue modulation and digital modulation can be used. A radio phone transmitting on the channel can also send signalling information, such as information about access rights, priorities, a group operating on the channel, or data traffic. On a direct mode channel, messages can be encrypted, or speech can be transmitted in clear form.

Subscriber stations operating in direct mode, i.e. on a direct mode channel, communicate with other subscriber stations on the direct mode channel without necessarily being in direct contact with the base stations of the radio network. They may, however, communicate with the radio network via repeater stations.

In normal direct mode channel communication, it is difficult for a (first) mobile station user to know which other mobile station users are on the direct mode channel, listening to possible transmissions of the first user. The problem appears when one wants to know whether a certain (second) mobile station and its user can be reached, i.e. whether the second mobile station hears the transmission of the first mobile station.

Another problem appears when one wants to know whether the transmission of the first mobile station is heard by a mobile station that should not hear it. Such an 'unauthorized' mobile station is, for example, a stolen mobile station, a mobile station belonging to some other, undesired group, or an otherwise undesired mobile station.

BRIEF DESCRIPTION OF THE INVENTION

The object of the invention is to provide a method of checking whether a desired mobile station is on a direct mode channel within the coverage area of the first mobile station and, if necessary, to check whether the user of the second mobile station is participating in a call or in communication on the direct mode channel.

It should be noted that a mobile station user can be a person using a mobile station or, alternatively, computer software using a mobile station for communication, or some other data processing application.

Another object of the invention is to provide a method by which it can be checked whether 'unauthorized' or undesired mobile stations are listening to the transmissions of the first mobile station on a direct mode channel.

Yet another object of the invention is to provide a method by which the 'unauthorized' or undesired mobile stations can be forced to stop communicating on the direct mode channel used by the first mobile station.

The objects of the invention are to be achieved without any communication between the users. Communication between the users is slow and not necessarily applicable to situations in which silence is required. It is naturally not possible to detect a stolen mobile station by an inquiry sent by the first mobile station user to the user of a second, stolen mobile station; a thief is unlikely to respond to an inquiry made on a direct mode channel.

The objects of the invention are to be achieved with minimal, short-term and, if necessary, secret communication on the radio path of a direct mode channel, so that the users of the other mobile stations communicating on the direct mode channel do not necessarily detect that a presence inquiry has been made.

A further object of the invention is to conduct a presence inquiry as quickly as possible to quickly ensure the safety of the direct mode channel.

A method of the invention for checking the presence of mobile stations communicating on a direct mode channel is characterized by the steps of: a) sending a presence inquiry message provided with an identity from a first mobile station to a second mobile station on the direct mode channel, b) receiving said presence inquiry message at the second mobile station, c) comparing the identity contained in said presence inquiry message with the identity of the second mobile station, d) if the comparison shows that the identities are identical, sending an acknowledgement containing the identity of the second mobile station from the second mobile station to the first mobile station on the direct mode channel, and e) indicating the result of the presence inquiry to the user of the first mobile station.

The invention also relates to a method of checking the presence of mobile stations communicating on a direct mode channel, the method being characterized by comprising the steps of: a) sending a presence inquiry message provided with an identity from a first mobile station to a second mobile station on the direct mode channel, the message containing negation data to be taken into account in a comparison made on the basis of the presence inquiry message, b) receiving said presence inquiry message at the second mobile station, c) comparing the identity contained in said presence inquiry message with the identity of the second mobile station, d) if the comparison shows that said identities are different, sending an acknowledgement from the second mobile station on the direct mode channel in response to said negation data and the comparison made in step c), the acknowledgement indicating the presence of the mobile station to the first mobile station, which has sent the presence inquiry message, and e) indicating the result of the presence inquiry to the user of the first mobile station.

The invention also relates to a mobile station communicating on a direct mode channel, the mobile station comprising: a transceiver, which is arranged to transmit and receive transmissions of a mobile station on the direct mode channel, memory means, a controller for controlling the operation of the mobile station.

The mobile station of the invention is characterized by comprising: transmission means for transmitting a presence inquiry message provided with an identity of a second mobile station to the second mobile station on the direct mode channel.

The invention also relates to a mobile station communicating on a direct mode channel, the mobile station comprising: a transceiver, which is arranged to transmit and receive transmissions of a mobile station on the direct mode channel, memory means, a controller for controlling the operation of the mobile station.

The mobile station of the invention is characterized by comprising: comparison means for comparing the identity contained in the presence inquiry message received by the mobile station with the identity of the mobile station, and acknowledgement transmission means, responsive to said comparison means, for transmitting an acknowledgement containing the identity of said mobile station to the mobile station that has sent the presence inquiry message.

The invention is based on the idea that when a first mobile station communicating on a direct mode channel wants to know whether other mobile stations or a certain mobile station is communicating on the same direct mode channel, the first mobile station sends a presence inquiry message on the direct mode channel. The message may contain the identity of a desired/paged mobile station, the identity of a group call group, or some other identity. The identity is received at the second mobile station communicating on the direct mode channel and is compared with the identity of that second mobile station. On the basis of the comparison, it is decided what the second mobile station will do next.

In a first embodiment of the invention, if the comparison shows that the identities are identical, the second mobile station sends the first mobile station an acknowledgement containing the identity of the second mobile station. From the acknowledgement the first mobile station learns that the second mobile station is communicating on the direct mode channel concerned. After receiving the acknowledgement, the first mobile station indicates the reception of the acknowledgement and its meaning to the user. Correspondingly, it is also possible to indicate it to the user if no acknowledgement is received at all during a certain time or certain time supervision. The user of the first mobile station can then conclude that the second, paged mobile station is not communicating on that particular direct mode channel.

In a second embodiment of the invention, negation data has been added to the presence inquiry message sent from the first mobile station, and the negation data is taken into account in the comparison made on the basis of the presence inquiry message. In response to the negation data and on the basis of the result obtained in the above comparison, if the comparison shows that the identity contained in the presence inquiry message sent by the first mobile station differs from the identity contained in the second mobile station, the second mobile station sends an acknowledgement on the direct mode channel, indicating its presence to the first mobile station, which has sent the presence inquiry message. After receiving the acknowledgement, the first mobile station indicates the reception of the acknowledgement and its meaning to the user. Correspondingly, it is possible to indicate it to the user if no acknowledgement is received at all during a certain time or certain time supervision. The first mobile station can then conclude that the undesired second mobile station is not communicating on that particular direct mode channel.

The advantage of the solution provided by the invention is that the method and mobile station of the invention are also suitable for detection of stolen mobile stations, since the user of the second mobile station, i.e. the thief, does not necessarily even notice that the first mobile station is making a presence inquiry.

The invention can also be implemented such that the presence inquiry made by the first mobile station is indicated to the user whose presence is inquired, i.e. to the user of the second mobile station, and that the user can respond to the presence inquiry e.g. by pressing a key, i.e. a response can be given quickly without using speech.

BRIEF DESCRIPTION OF THE DRAWINGS

In the following the invention will be described in greater detail with reference to the attached drawings, in which.

DETAILED DESCRIPTION OF THE INVENTION

The method of the invention is used in direct mode operation to check whether a desired second mobile station is within the coverage area of the first mobile station. The inquiry is made in such a way that, if desired, the inquiry is not indicated in any way to the user of the mobile station inquired about, i.e. the second mobile station. This makes it possible to check the presence of a mobile station without that the user of the second mobile station notices the inquiry made. The invention is also useful in forcing a known mobile station that one does not want to be able to communicate on the direct mode channel concerned to leave the channel. For example, presence of a stolen mobile station can be checked, and if one is detected, it can be prevented from operating on the direct mode channel or from operating altogether. If desired, a presence inquiry can also be made such that the inquiry is indicated to the user when a user-level acknowledgement of the inquiry is desired.

Figure 1:
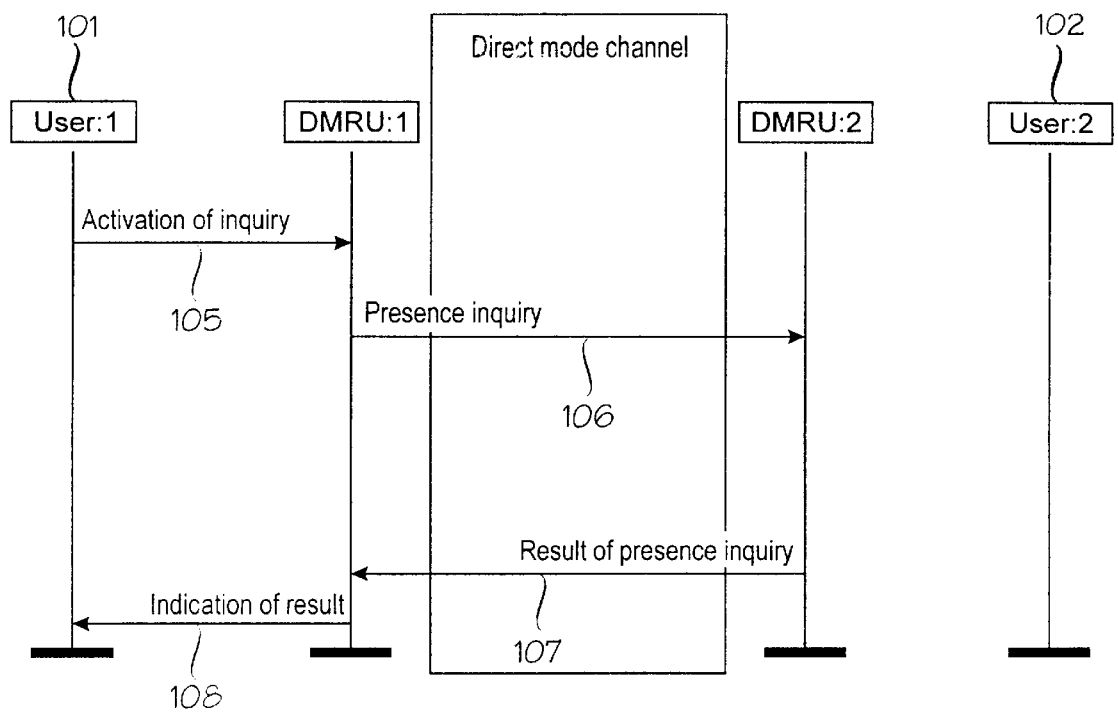
FIG. 1 is a signal flow diagram illustrating an equipment-level presence inquiry.

FIG. 1 is a signal flow diagram illustrating an equipment-level presence inquiry. The figure shows a first mobile station DMRU:1 operating on a direct mode channel, the mobile station being used by a first user:1 101. A second mobile station DMRU:2 operated by a second user:2 102 is also communicating on the direct mode channel. A presence inquiry can be activated by the first mobile station DMRU:1 either by software or by inquiry activation 105 conducted by the first user 101. When the presence inquiry has been activated, the first mobile station DMRU:1 sends 106 a presence inquiry message to the direct mode channel in accordance with the invention, and the message is received by the other mobile stations communicating on the direct mode channel, here the second mobile station DMRU:2.

In the invention, the second mobile station analyzes the presence inquiry received in the following way:

In a first embodiment of the invention, the analysis is carried out by comparing the identity contained in the presence inquiry message at the second mobile station with the identity found in the memory of the second mobile station. The identity contained in the presence inquiry message may be an equipment identity of a mobile station or a personal subscriber identity of a mobile station subscriber. It is also possible that the identity is an identity of a group call group. The presence inquiry message may also contain other identities. Any one of these identities and one or more other identities may have been stored in the second mobile station.

If the comparison shows that the identities are identical, an acknowledgement containing the identity of the second mobile station is sent 107 from the second mobile station DMRU:2 to the first mobile station DMRU:1. From the acknowledgement the first mobile station learns that the second mobile station is communicating on that particular direct mode channel. After receiving the acknowledgement, the first mobile station DMRU:1 indicates 108 the reception of the acknowledgement and its meaning to the user. The indication is e.g. a visual signal given via the user interface of the mobile station. When a presence inquiry is sent from the first mobile station DMRU:1, time supervision can be started. If no acknowledgement is received during a certain time or certain time supervision, it can be indicated to the first user 101 via the user interface. The user 101 of the first mobile station can then conclude that the second, paged mobile station DMRU:2 is not communicating on that particular direct mode channel.

In a second embodiment of the invention, negation data has been added to the presence inquiry message sent 106 from the first mobile station, the negation data being taken into account in the comparison conducted on the basis of the presence inquiry message. The presence inquiry received by the second mobile station is analyzed by comparing the identity contained in the presence inquiry message at the second mobile station with the identity found in the memory of the second mobile station. The possible contents of these identities are described above in connection with the description of the first embodiment of the invention. If the comparison conducted shows that the identity sent by the first mobile station in the presence inquiry message differs from the identity of the second mobile station, then, in response to the negation data and on the basis of the result of the comparison described above, the second mobile station DMRU:2 sends 107 an acknowledgement on the direct mode channel, indicating its presence to the first mobile station DMRU:1, which has made the presence inquiry. After receiving the acknowledgement, the first mobile station DMRU:L indicates the reception of the acknowledgement and its meaning to the user via the user interface. Correspondingly, it can be indicated to the user if an acknowledgement is not received at all during a certain time or certain time supervision. The first mobile station can then conclude that the second, undesired mobile station is not communicating on that particular direct mode channel. In the second embodiment of the invention, it can be easily detected whether an undesired mobile station is listening to the transmission of the first mobile station on the direct mode channel. The time supervision and indication are described in greater detail above in connection with the description of the first embodiment of the invention.

Figure 2:
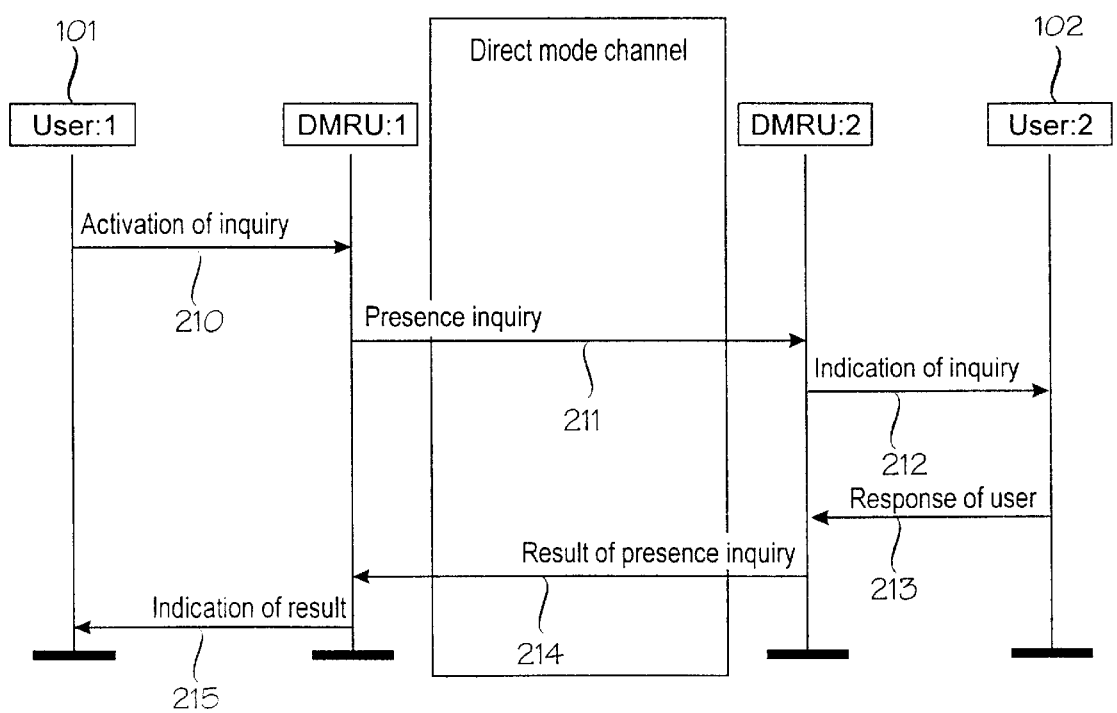
FIG. 2 is a signal flow diagram illustrating a user-level presence inquiry.

FIG. 2 illustrates a user-level presence inquiry. In the figure, steps 210, 211, 214 and 215 correspond to steps 105, 106 ,107 and 108 of FIG. 1. In FIG. 2, the inquiry, since it is a user-level inquiry, is indicated 212 to the user 102 of the second mobile station and an inquiry response timer is started. If a reply/response 213 is received from the user 102 before the timer times out, the mobile station acknowledges 214 the reception of the inquiry on the direct mode channel, including therein information about a positive user-level acknowledgement. If no user-level acknowledgement 213 is received before the response timer times out, the mobile station acknowledges the reception of the inquiry on the direct mode channel, including therein information about a negative user-level acknowledgement. After acknowledging the inquiry, the mobile station continues its previous function.

In the method, if the comparison described in FIG. 1 (step d, claim 1) shows that the identities compared are identical, the identification number of the user 102 of the second mobile station DMRU:2 is inquired. The correctness of the identity is checked at the second mobile station DMRU:2. If the identification number supplied 213 by the user 102 is acceptable, an acknowledgement that contains the identity of the second mobile station and information indicating that the user has entered an acceptable identification number in the second mobile station is sent 214 from the second mobile station DMRU:2 to the first mobile station DMRU:1 on the direct mode channel.

The identification number inquired from the user 102 of the second mobile station DMRU:2 may be a personal identification number authorizing the user to use a mobile station. It may be, for example, a PIN code (Personal Identification Number).

Also, the identification number inquired from the user 102 of the second mobile station DMRU:2 may be a personal identification number authorizing the user to use a SIM card (Subscriber Identity Module) connected to a mobile station.

Further, the identification number inquired from the user 102 of the second mobile station DMRU:2 may be a personal or a group-specific identification number authorizing the user to use one or more direct mode channels.

If the first mobile station DMRU:1 wants to make sure that its transmissions are really listened to on the direct mode channel, the following steps are taken. The second mobile station DMRU:2 indicates the reception of the presence inquiry message 211 sent by the first mobile station to the user 102 of the second mobile station. This means that the user interface of the second mobile station DMRU:2 supplies, for example, a visual signal to the user 102, the signal indicating that the user 102 should react in some way if he/it is participating in a call on the direct mode channel,. If the user of the second mobile station DMRU:2 wants to participate in a call, he/it should then confirm the participation by giving an indication via the user interface of the mobile station, i.e. e.g. by giving a command or pressing a signalling key.

The first mobile station DMRU:1 is informed of the indication given by the second mobile station by an acknowledgement 214, which is further indicated 215 to the user 101 of the first mobile station.

Figure 3:
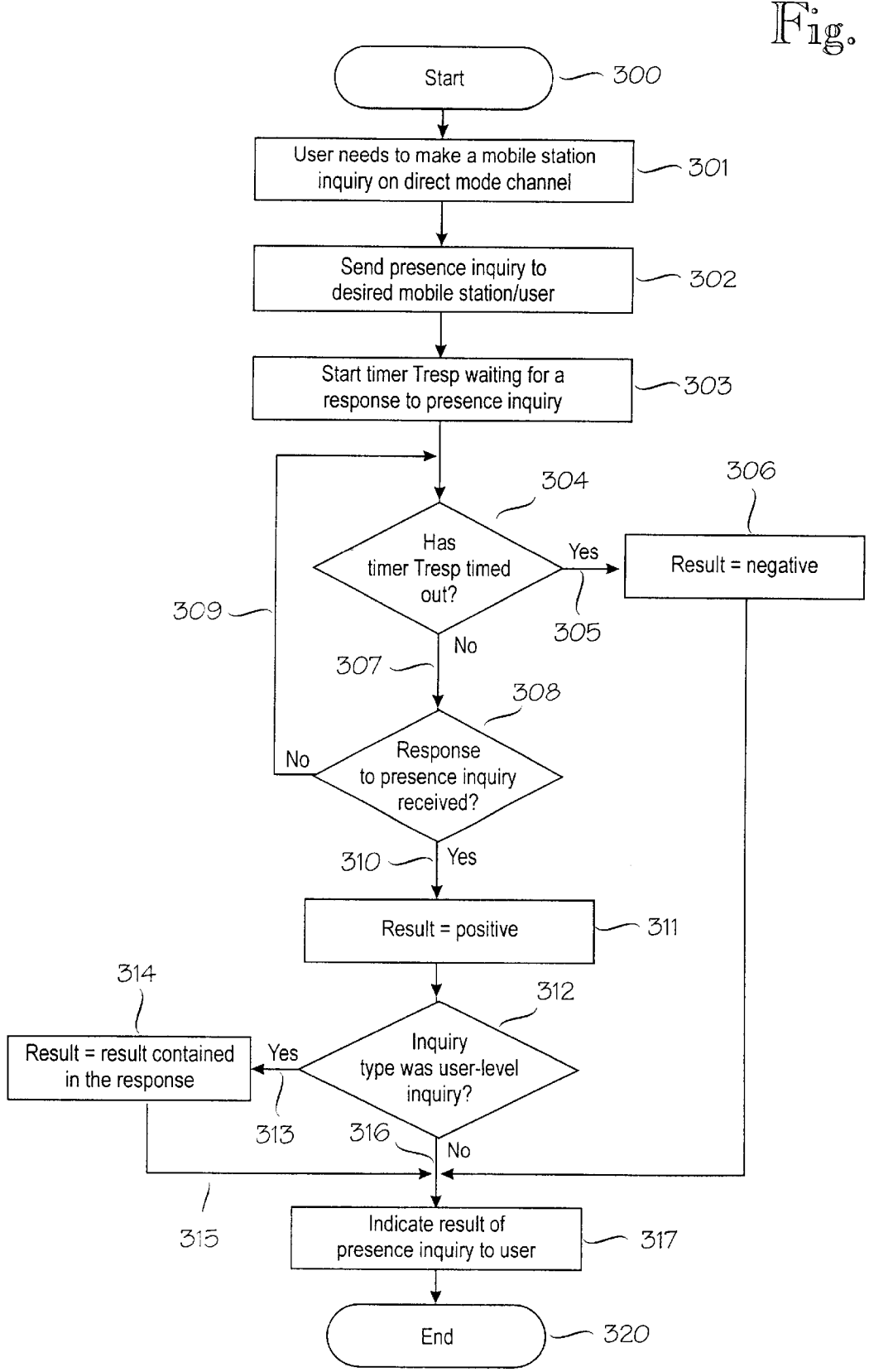
FIG. 3 is a flow diagram illustrating the operation of an inquiring mobile station operating in accordance with the method of the invention.

FIG. 3 is a flow diagram illustrating the operation of the method provided by the invention in the equipment making the inquiry. The method starts in step 300. When a presence inquiry is needed 301, the user of the mobile station making the inquiry—the user may also be an application using a mobile station—activates a presence inquiry. The inquiring user determines the mobile station or the mobile station user that the inquiry is sent to and activates the inquiry.

The inquiring mobile station, i.e. the first mobile station DMRU:1, sends 302 a presence inquiry on a direct mode channel and starts 303 a timer, i.e. time supervision means (FIG. 5), for waiting for a response to the presence inquiry message and for starting indication of the response and the result of the time supervision to the user of the mobile station. Step 304 monitors whether the time supervision means, i.e. timer Tresp, have timed out. If no response is received 305 before the time supervision stops, the presence inquiry gives a negative result 306, which is indicated to the user in step 317. If, on the other hand, a response is received 310 during the time supervision, i.e. if the time supervision has not stopped yet, an inquiry 308 is made to find out whether a response has been received to the presence inquiry, i.e. whether the second mobile station has responded to the inquiry concerning its presence. If not, step 304 is returned to 309. If, on the other hand, a response 310 to the presence inquiry is received, then the result of the presence inquiry is known to be positive 311. In step 312 it is noted that the inquiry is a user-level inquiry 313 in type, whereby the mobile station knows that the result 314 of the presence inquiry is the result given in the response. Subsequently, one moves 315 to step 317, in which the result of the presence inquiry is indicated to the user that has activated the inquiry. The result of the inquiry may also lead to authentication of the mobile station inquired about.

The inquiry may also be directed to a predetermined list of mobile stations, enumerating, for example, mobile stations/mobile station users operating in a group, or stolen mobile stations.

Further, the identity inquired may be a group call group identity, whereby all the mobile stations that have received the presence inquiry message and contain the group identity concerned send an acknowledgement on the direct mode channel.

A user is here either a final user of a mobile station or an application that uses a mobile station for communication.

Figure 4:
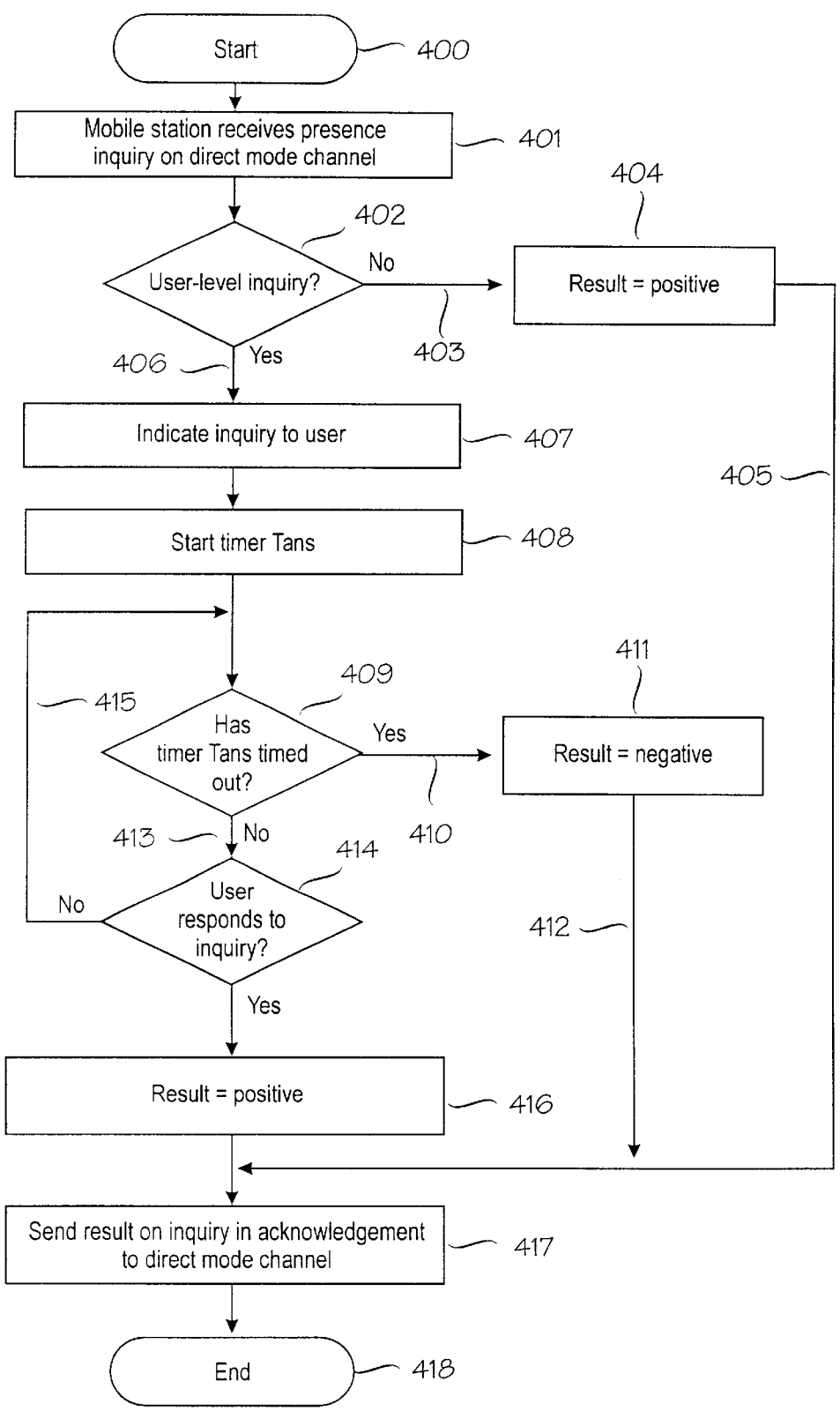
FIG. 4 is a flow diagram illustrating the operation of a mobile station inquired about, the mobile station operating in accordance with the method of the invention.

FIG. 4 illustrates the method in an equipment inquired about, i.e. in a mobile station whose presence on a direct mode channel is to be checked or prevented.

The method starts in step 400. After receiving 401 a presence inquiry concerning itself in the manner described above in connection with FIGS. 1, 2 and 3, the mobile station inquired about checks 402 the type of the inquiry. The inquiry may be of two different types: (1) an equipment-level inquiry, (2) a user-level inquiry. If it is an equipment-level inquiry, i.e. not 403 a user-level inquiry, the mobile station concludes that it can respond to the inquiry 404 directly without an indication to the user and without a response from the user. One then moves 405 to step 417, in which the mobile station responds to the presence inquiry received by acknowledging the reception of the inquiry, and as a result of the inquiry, a positive acknowledgement is sent on the direct mode channel.

If it is detected in step 402 that the inquiry is 406 a user-level inquiry, then the inquiry is indicated 407 to the user, for example, via the user interface. A time supervision means Tans is then also started 408, the means measuring the time given to the user of the mobile station to respond to the presence inquiry indicated 407. In step 409 it is monitored whether the time supervision 408 has stopped. If the timer Tans has timed out 410, the mobile station concludes that the result is negative 411, since the user has not responded to the presence inquiry during the time supervision 408. One then moves 412 to step 417, in which a negative acknowledgement is sent to the (first) mobile station that has sent the presence inquiry.

If, on the other hand, it is detected in step 409 that the timer/time supervision means Tans has not timed out 413, the next measure is to check 414 whether the user of the mobile station has responded to the inquiry indicated. As long as the check shows that no response has been received, one returns 415 to step 409. But when the user has responded to the inquiry, the mobile station concludes that the result of the inquiry is positive 416, i.e. that the user of the mobile station is on the direct mode channel. In this case one moves to step 417, in which a (positive) acknowledgement is sent to the (first) mobile station, which has sent the presence inquiry. The method is subsequently ended in step 418.

Figure 5:
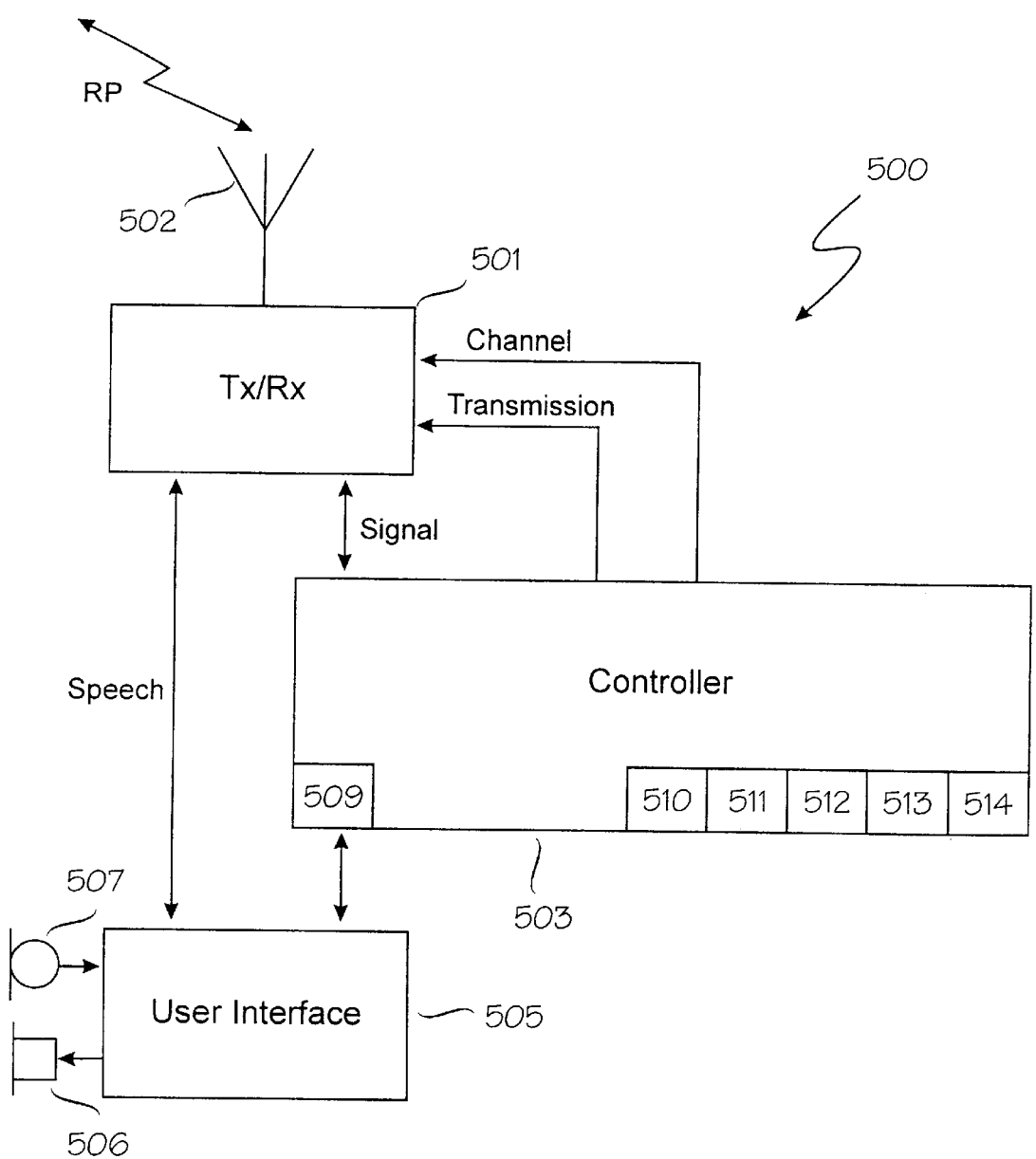
FIG. 5 is a block diagram illustrating a mobile station of the invention operating on a direct mode channel.

FIG. 5 is a block diagram of a mobile station 500 of the invention communicating on a direct mode channel, i.e. a radio phone, mobile station or e.g. a subscriber station used by the user. The function of a transceiver (TX/RX) 501 is to tune to the channel used. To the transceiver 501 is connected an antenna 502, which is connected to the radio path RP. Usually, radio frequencies in the range of 60 to 1000 MHz (VHF and UHF ranges) are used, but other frequencies are also possible. On the radio path RP, analogue modulation can be used, the modulation then being usually phase modulation. Other kinds of modulation can also be used. Signalling can be transmitted e.g. by a voice-frequency subcarrier wave (FFSK). Transmission over a radio path can also be digital.

A user interface 505 comprises electroacoustic transducers, typically a headphone 506 and a microphone 507, and optionally buttons for starting and ending a call, and for dialling. Since in a trunking system, and especially on a direct mode channel, transmission over a radio path RP is advantageously unidirectional, the subscriber station usually also has a push-to-talk button that must be depressed during a speech item. The push-to-talk button is not shown in FIG. 5.

The function of a controller 503 is to control the operation of the mobile station. The controller 503 is connected to the user interface 505, from which it receives impulses e.g. for starting and ending a call. The controller 503 may also give the user, via the user interface 505, acoustic or visual signals that relate to the operation of the radio phone and/or the mobile telephone system.

The controller 503 is connected to the transceiver TX/RX 501. The channel used by the transceiver is allocated by the controller 503, i.e. the transceiver 501 tunes to the channel, i.e. radio frequency and a suitable time slot, allocated by the controller 503. The mobile station of the invention is able to tune to a direct mode channel, and to uplink and downlink channels and frequencies of system channels. The transceiver 501 is also activated by the controller 503. The controller 503 receives and transmits signalling messages through the transceiver 501. The mobile station 500 of the invention communicating on a direct mode channel can be used e.g. in a radio system that comprises a radio network with at least one base station, mobile stations, and one or more repeater stations that relay traffic between the at least one base station and the subscriber stations communicating on the direct mode channel. The mobile station communicating on the direct mode channel then comprises a memory means 511, a transceiver 501, and a controller 503 for controlling the operation of the mobile station.

The inventive mobile station 500 DMRU; 500; FIG. 5 communicating on a direct mode channel divided into frames that contain time slots comprises: a transceiver 501, which is arranged to transmit and receive transmissions of a mobile station, a controller 503 for controlling the operation of the mobile station, and memory means 509.

The mobile station 500 of the invention also comprises: transmission means 510 for transmitting a presence inquiry message provided with the identity of a second mobile station to the second mobile station on the direct mode channel.

The mobile station 500 of the invention may also comprise time supervision means 511 for waiting for a response to a presence inquiry message and for starting indication of the response and the result of the time supervision to the mobile station user.

The mobile station of the invention further comprises indication means 512 for indicating the result of the presence inquiry to the user of the mobile station.

The mobile station of the invention further comprises comparison means 513 for comparing the identity contained in the presence inquiry message received by the mobile station with the identity contained in the mobile station, and acknowledgement transmission means 514, responsive to said comparison means, for transmitting an acknowledgement containing the identity of said mobile station to the mobile station that has sent the presence inquiry. The mobile station is then the mobile station whose participation in communication on a direct mode channel is being checked.

The drawings and the description thereof are intended only to illustrate the idea of the invention. The method and mobile station of the invention may vary in their details within the scope of the claims.

What is claimed is:

1. A method for checking the presence of mobile stations communicating on a direct mode channel, the method comprising:

a) sending a presence inquiry message from a first mobile station to a second mobile station on the direct mode channel, the presence inquiry message being provided with an identity and containing negation data;
   b) receiving said presence inquiry message at the second mobile station;
   c) comparing at the second mobile station, the identity contained in said presence inquiry message with the identity found in memory of the second mobile station;
   d) if the comparison shows that the identities are different, taking into account the negation data of the inquiry message, sending an acknowledgement from the second mobile station on the direct mode channel in response to said negation data and the comparison made in step c), the acknowledgement indicating the presence of the second mobile station to the first mobile station which sent the presence inquiry message; and
   e) indicating by the first mobile station, the result of the presence inquiry to the user of the first mobile station.

2. A method for checking the presence of mobile stations communicating on a direct mode channel, the method comprising:

a) sending a presence inquiry message from a first mobile station to a second mobile station on the direct mode channel, the presence inquiry message being provided with an identity and containing negation data;
   b) receiving said presence inquiry message at the second mobile station;
   c) comparing at the second mobile station, the identity contained in said presence inquiry message with the identity found in memory of the second mobile station;
   d) if the comparison shows that the identities combined with the negation data different compared to corresponding data received in the inquiry message, sending an acknowledgement from the second mobile station to the first mobile station on the direct mode channel as a response to said negation data and the comparison made in step c), the acknowledgement indicating the presence of the second mobile station to the first mobile station which sent the presence inquiry message; and
   e) indicating by the first mobile station, the result of the presence inquiry to the user of the first mobile station.

* * * * *